United States Patent
Hiraishi et al.

(10) Patent No.: US 10,843,392 B2
(45) Date of Patent: Nov. 24, 2020

(54) DECORATIVE MOLDING METHOD AND DECORATIVE MOLDING APPARATUS

(71) Applicant: Panasonic Intellectual Property Management Co., Ltd., Osaka (JP)

(72) Inventors: Masakazu Hiraishi, Kyoto (JP); Kazuhiko Kaneuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 240 days.

(21) Appl. No.: 15/919,810

(22) Filed: Mar. 13, 2018

(65) Prior Publication Data
US 2018/0290357 A1 Oct. 11, 2018

(30) Foreign Application Priority Data
Apr. 6, 2017 (JP) ................. 2017-075618

(51) Int. Cl.
*B29C 45/14* (2006.01)
*B29L 31/00* (2006.01)
*B29K 667/00* (2006.01)

(52) U.S. Cl.
CPC .. *B29C 45/14688* (2013.01); *B29C 45/14016* (2013.01); *B29C 45/14065* (2013.01);
(Continued)

(58) Field of Classification Search
CPC ........ B29C 45/14016; B29C 45/14688; B29C 45/14827; B29C 45/14065;
(Continued)

(56) References Cited

U.S. PATENT DOCUMENTS

2001/0038493 A1* 11/2001 Watanabe ......... B29C 45/14827
359/609
2014/0239550 A1 8/2014 Nakagawa et al.
(Continued)

FOREIGN PATENT DOCUMENTS

JP 2-301413 12/1990
JP 2-310018 12/1990
(Continued)

*Primary Examiner* — Xiao S Zhao
*Assistant Examiner* — John J Derusso
(74) *Attorney, Agent, or Firm* — Wenderoth, Lind & Ponack, L.L.P.

(57) ABSTRACT

In a decorative molding method a film having an uneven shape printed thereon and a film having a pattern printed thereon are separately supplied to a metal mold, the films are positioned separately, and a molding material is simultaneously injected into the metal mold to carry out injection molding. In a decorative molding apparatus for realizing the above method, a suction circuit for adsorbing each of the films on a film adsorption surface of the metal mold and an air blowing circuit for peeling off the films are disposed, and, after the injection molding, air blowing on each film is started separately from the start of opening of the metal mold, and the metal mold and the films are brought into a positive pressure state, then the molded article is taken out, a clamp jig is released to release the films, and the air blowing continues until the following patterns of the films are placed inside the metal mold.

9 Claims, 8 Drawing Sheets

(52) U.S. Cl.
CPC ............... *B29C 45/14827* (2013.01); *B29C 2045/1477* (2013.01); *B29C 2045/14155* (2013.01); *B29C 2045/14696* (2013.01); *B29C 2045/14704* (2013.01); *B29C 2045/14713* (2013.01); *B29K 2667/003* (2013.01); *B29K 2995/0026* (2013.01); *B29L 2031/722* (2013.01)

(58) Field of Classification Search
CPC .. B29C 2045/14713; B29C 2045/1477; B29C 45/14811
See application file for complete search history.

(56) References Cited

U.S. PATENT DOCUMENTS

| | | | | |
|---|---|---|---|---|
| 2016/0297126 | A1* | 10/2016 | Hiraishi | B29C 45/14688 |
| 2020/0016802 | A1* | 1/2020 | Hahn | B29C 45/14016 |

FOREIGN PATENT DOCUMENTS

| | | |
|---|---|---|
| JP | 10-34704 | 2/1998 |
| JP | 3117032 B | 12/2000 |
| JP | 5308229 B | 10/2013 |
| JP | 2014-162022 | 9/2014 |
| JP | 2014-223742 | 12/2014 |
| JP | 2015-168244 | 9/2015 |

\* cited by examiner

DECORATIVE MOLDING METHOD AND DECORATIVE MOLDING APPARATUS

TECHNICAL FIELD

The present disclosure relates to a decorative molding method and a decorative molding apparatus using a decorative film to transfer a pattern having an uneven shape to a surface of a molded article for molding resin.

BACKGROUND

In decorative molding apparatuses described in Japanese Patent Unexamined Publication No. 2014-162022 and the like, a metal mold for injection-molding a resin material is formed of a first mold and a second mold. A high-precision injection molded body is formed by inserting a decorative film in a clamped state between the first mold and the second mold in an open state and injecting a resin onto the decorative film. A decorative film or a functional film printed or laminated on the decorative film is also simultaneously transferred onto the molded body.

In the decorative molding procedure, first, a decorative film or a functional film is printed or transferred/laminated on the roll-shaped decorative film in advance, and the decorative film is installed between the first mold and the second mold.

Next, the decorative film is fixed to the first mold with a clamp jig.

Next, the second mold is moved into a clamped state in close contact with the first mold, and molten resin is injected into the metal mold to form a predetermined molded body. At this time, the decoration on the decorative film is transferred to the molded article. After cooling for a certain period of time, the molded article is taken out.

In addition, Japanese Patent No. 3117032, Japanese Patent No. 5308229, and the like describe a decorating method in which an uneven shape is provided on the surface of a molded body. The decorative film illustrated in FIG. 5 of Japanese Patent No. 3117032 is formed with an uneven layer formed with predetermined unevenness on a base material film, a transfer layer transferring the shape of the uneven layer, a printed layer on which a pattern is printed, and an adhesive layer for adhering to the molded body. Using the decorating method described in Japanese Patent No. 5308229 along with the decorative film described in Japanese Patent No. 3117032 makes it possible to mold a molded body having an uneven shape on the surface thereof.

SUMMARY

Since frictional force between the uneven layer having the unevenness and the pattern layer is strong in the decorative film described in Japanese Patent No. 3117032, the uneven layer may break or the pattern layer may split at the time of a change in the moving direction due to a roller or the like when supplied by the roller or in a state where a bending force is exerted on the film such as during roller storage, as in Japanese Patent No. 5308229.

Even if the uneven layer of the decorative film has flexibility, wrinkles are caused by the air layer between the films and differences in the expansion and contraction of the films during injection molding. As a result, there is a problem in that these wrinkles are transferred to the surface of the molded article and the quality of the appearance deteriorates.

In addition, when the decorative film is peeled off, it is not possible to peel off the film normally and wrinkles are caused when winding the used decorative film, which may spread to the following molded article. Alternatively, when the decorative film is adsorbed and fixed to the first mold at the time of the following molding, the relative positional relationship between the uneven layer of the decorative film and the pattern layer may be shifted due to the influence of the wrinkles, which further deteriorates the quality of the appearance.

The present disclosure is intended to solve the problems of the related art, and it is an object of the present disclosure to provide a decorative molding method and a decorative molding apparatus which are able to transfer an uneven shape to a pattern layer with high precision and to improve the quality of the appearance of a molded article.

In order to achieve the object described above, the decorative molding method of the present disclosure includes separately supplying a first film, to which an uneven shape is imparted, and a second film, to which a pattern is imparted, inside one metal mold while the first film and the second film are spaced apart from each other, separately positioning the first film and the second film, and injecting a molding material into the metal mold such that a pattern to which an uneven shape is imparted is transferred while simultaneously molding a molded article.

In addition, the decorative molding apparatus of the present disclosure includes a first unwinding unit for unwinding a first film to which an uneven shape is imparted, a second unwinding unit for unwinding a second film to which a pattern is imparted, a feeding mechanism for separately passing the belt-shaped first film unwound from the first unwinding unit and the belt-shaped second film unwound from the second unwinding unit between a first mold and a second mold forming a metal mold while the first film and the second film are spaced apart from each other, a clamp jig for pressing the first film and the second film against the first mold, a vacuum suction circuit for suctioning and bringing the second film into close contact with the first mold via the first film on the first mold, an air blowing circuit for blowing air onto the first film and the second film as the metal mold is opened and pressing by the clamp jig is released, and a winding unit in which each used section of the first film and the second film is wound separately in a state where the first film and the second film are spaced apart from each other such that a following uneven shape of the first film and a following pattern of the second film each arrive at a molding position of the metal mold, in which a molding material is injected into the metal mold in a clamped state to mold a molded article.

According to this configuration, it is possible to transfer an uneven shape to a pattern layer with high precision by in-mold simultaneous decorative molding and to improve the quality of the appearance of the molded article.

DESCRIPTION OF EMBODIMENTS

A description will be given of the decorative molding method of the present disclosure based on each embodiment.

Embodiment 1

FIG. 1, FIG. 2A, FIG. 2B, and FIG. 3 show a decorative molding apparatus for realizing the decorative molding method of the present disclosure.

Figure 1:
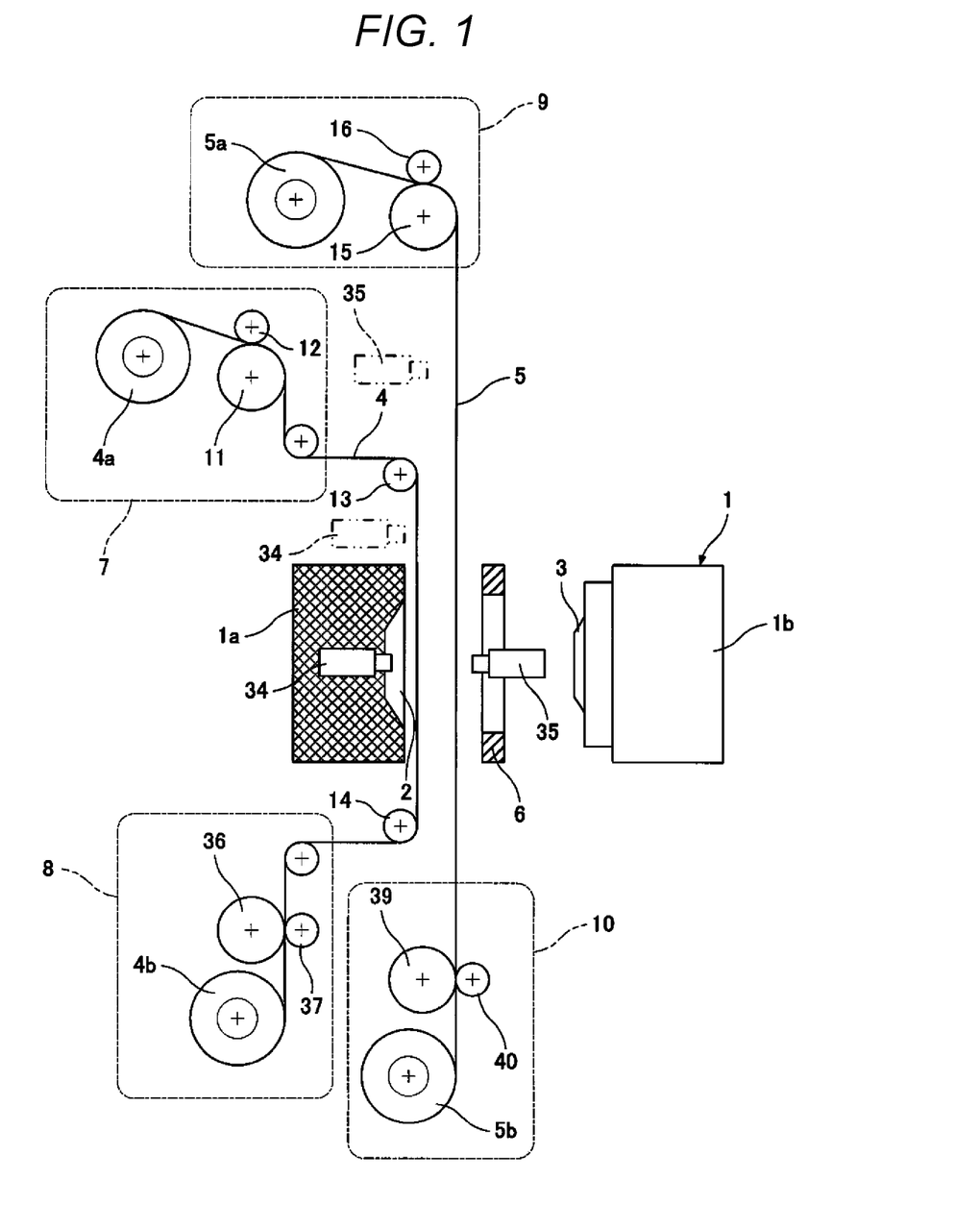
FIG. 1 is a configuration diagram of a decorative molding apparatus for realizing the decorative molding method of the present disclosure.
Figure 2A:
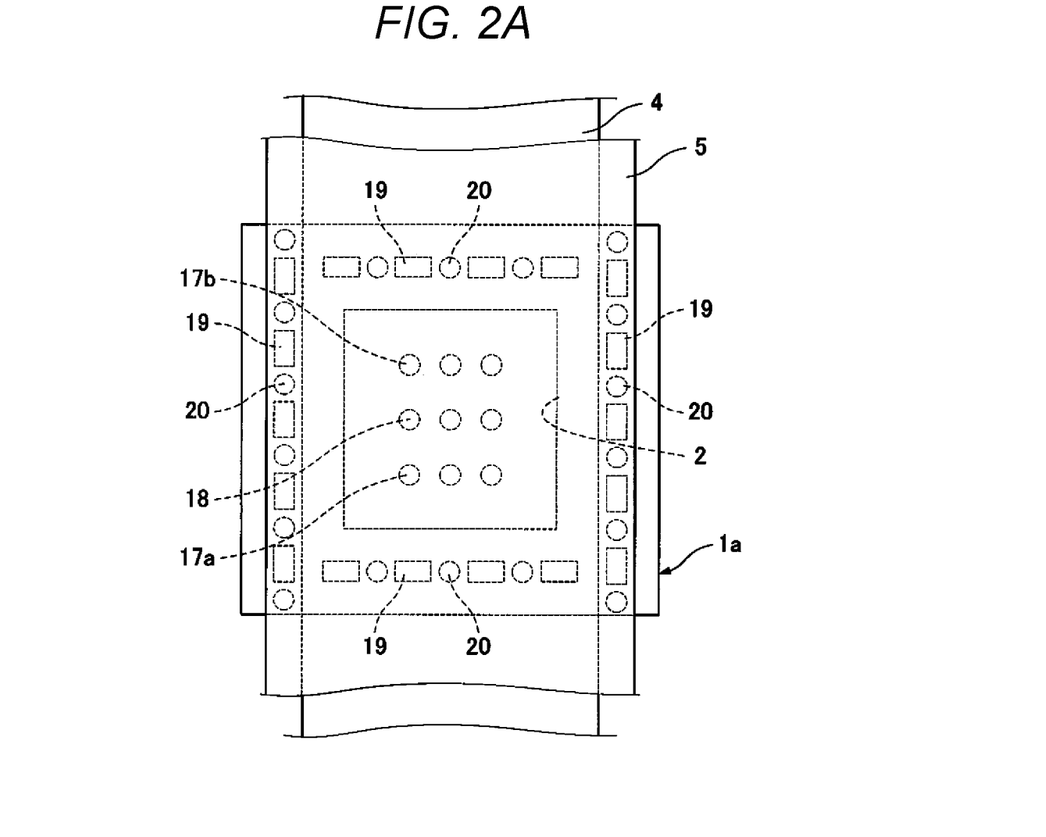
FIG. 2A is a plan diagram showing a relationship between a first mold and two films in the same Embodiment 1 and FIG. 2B is a cross-sectional view of main parts thereof.
Figure 2B:
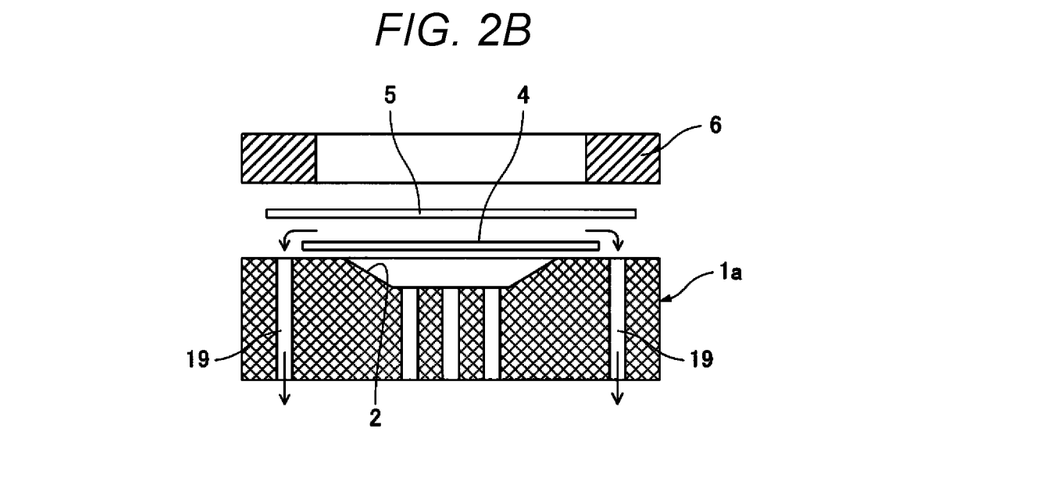

Metal mold 1 is formed of first mold 1a and second mold 1b which are clamped to form a cavity, and the cavity is formed between recessed portion 2 of first mold 1a and projection portion 3 of second mold 1b. Film 4 as a belt-shaped first film, to which an uneven shape is imparted on the surface thereof, and film 5 as a belt-shaped second film, to which a pattern is imparted on the surface thereof, are supplied to metal mold 1 by intermittent transfer in synchronization with the molding cycle. Regarding the disposition of film 4 and film 5, film 4 is disposed so as to be on the side of first mold 1a. Marks are formed on film 4 and film 5 at predetermined intervals in the longitudinal direction respectively in order to detect the supply amounts.

As shown in FIG. 2A, film 4 has a smaller film width than film 5 in Embodiment 1. Depending on the shape of the molded article, film 4 is narrower by 10 mm or greater on each side equally. Metal mold 1 is provided with clamp jig 6 which presses and fixes film 4 and film 5 against first mold 1a at the time of clamping.

Film 4 moving between first mold 1a and second mold 1b is stretched between unwinding unit 7 and winding unit 8. Unwinding unit 7 is provided with a feeding mechanism.

Film 5 moving between first mold 1a and second mold 1b is stretched between unwinding unit 9 and winding unit 10. Unwinding unit 9 is provided with a feeding mechanism.

Unwinding unit 7, which also has a structure capable of carrying out positioning in the film width direction, is formed of unwinding roller 11 for feeding out film 4 from wound body 4a, and unwinding pinch roller 12 for pressing film 4 against unwinding roller 11 such that film 4 is able to be fed out following unwinding roller 11. Unwinding roller 11 is able to determine the rotation amount and the feeding amount of film 4. Film 4 fed out from unwinding unit 7 is inserted between first mold 1a and clamp jig 6 and is wound by winding unit 8 via guide roller 13 then via guide roller 14.

Unwinding unit 9 having a structure capable of carrying out positioning in the film width direction independently from unwinding unit 7 is formed of unwinding roller 15 for feeding out film 5 from wound body 5a, and unwinding pinch roller 16 for pressing film 5 against unwinding roller 15 such that film 5 is able to be fed out following unwinding roller 15. Unwinding roller 15 is able to determine the rotation amount and the feeding amount of film 5. Film 5 fed out from unwinding unit 9 is inserted between clamp jig 6 and second mold 1b and wound by winding unit 10.

Figure 3:
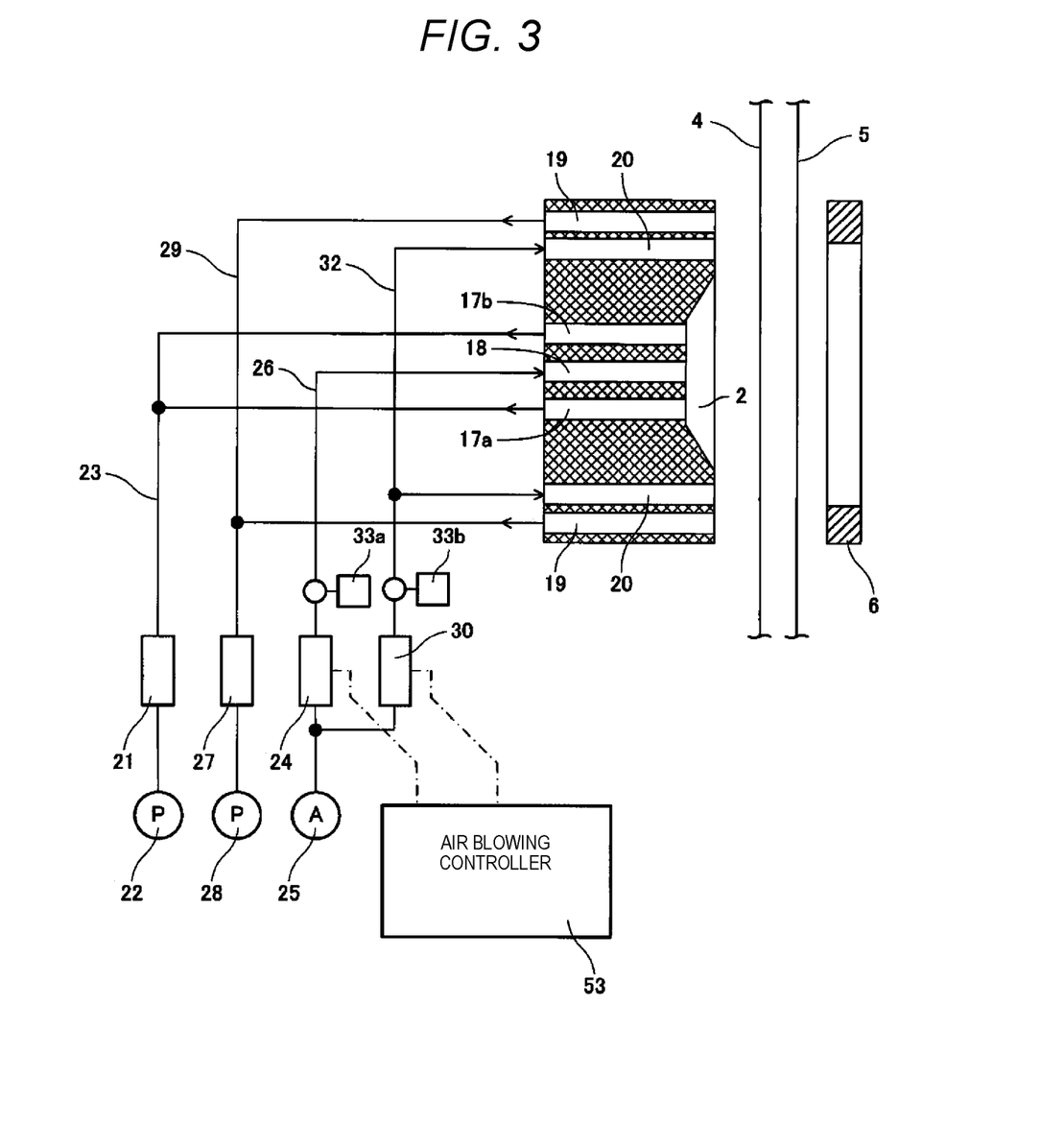
FIG. 3 is a configuration diagram of a fluid circuit in the same embodiment.

As shown in FIG. 2A, first mold 1a is provided with adsorption holes 17a and 17b and outlet holes 18 which are open inside recessed portion 2 and adsorption holes 19 and outlet holes 20 which are open outside recessed portion 2 at the periphery thereof. As shown in FIG. 3, adsorption holes 17a and 17b are connected to vacuum suction circuit 23 as a first vacuum suction circuit formed of electromagnetic valve 21 and vacuum pump 22. Outlet hole 18 is connected to air blowing circuit 26 as a first air blowing circuit formed of flow regulating valve 24, air supply source 25, and pressure gauge 33a. Adsorption holes 19 are connected to vacuum suction circuit 29 as a second vacuum suction circuit formed of electromagnetic valve 27 and vacuum pump 28. Outlet holes 20 are connected to air blowing circuit 32 as a second air blowing circuit formed of flow regulating valve 30, air supply source 25, and pressure gauge 33b.

Vacuum suction circuit 23 which adsorbs film 4 during molding is formed of vacuum pump 22 and electromagnetic valve 21 for turning the circuit on and off. The places to be suctioned often depend on the shape of molded article 31, but it is desirable to suction places corresponding to recessed portion 2 of first mold 1a and/or places where the resin as a molding material to be injected does not go around and/or places where there is no decorative pattern. After the vacuum suction is completed, vacuum suction circuit 23 releases the vacuum to the atmosphere but does not perform air blowing. This is so that any foreign materials suctioned into vacuum suction circuit 23 at the time of vacuum suction or foreign materials originally present in the vacuum suction flow path are not discharged from first mold 1a to film 4 side.

Vacuum suction circuit 29 for adsorbing film 5 at the time of molding is formed of vacuum pump 28 and electromagnetic valve 27 for turning the circuit on and off. The places to be suctioned often depend on the shape of molded article 31, but instead of places where film 4 and film 5 overlap, it is desirable to suction places where only film 5 is able to be adsorbed and/or places without a decorative pattern. After the vacuum suction is completed, vacuum suction circuit 29 releases the vacuum to the atmosphere but does not perform air blowing. This is so that any foreign materials suctioned into vacuum suction circuit 29 at the time of vacuum suction or foreign materials originally present in the vacuum suction flow path are not discharged from first mold 1a to film 5 side.

In Embodiment 1, air blowing circuit 32 for releasing film 5 is formed of air supply source 25, flow regulating valve 24, and pressure gauge 33b. Since air blowing circuit 32 carries out the discharging from the vicinity of clamp jig 6, there is also an effect of preventing the introduction of foreign matter from the surroundings.

Film 4 fed between first mold 1a and second mold 1b by the feeding mechanism of unwinding units 7 and 9 is fixed to first mold 1a by vacuum suction circuit 23 and clamp jig 6, and film 5 is fixed to first mold 1a by vacuum suction circuit 29 and clamp jig 6.

Camera 34 as a first camera shown in FIG. 1 detects a mark imparted to film 4. The attachment position of camera 34 is preferably installed in first mold 1a, but may be located outside first mold 1a and at a position between first mold 1a and unwinding unit 7 as indicated by virtual lines.

Camera 35 as a second camera detects a mark imparted to film 5. The attachment position of camera 35 is preferably installed in first mold 1a, but may be located outside first mold 1a and at a position between first mold 1a and unwinding unit 9 as indicated by virtual lines.

Winding unit 8 is formed of winding torque roller 36 for winding used film 4 at a constant torque after molding is completed, and winding pinch roller 37 for pressing film 4 against winding torque roller 36 in order for film 4 to follow winding torque roller 36. 4b is a wound body of used film 4. When film 4 is fixed to first mold 1a at the time of molding, in order to maintain or restore the shape and size of the pattern at the time of printing without causing wrinkles, winding torque roller 36 measures the tension thereof using a tension measuring device (not shown) and adjusts film 4 to a specified tension. Furthermore, winding unit 8 also has a structure which is able to carry out positioning in the film width direction.

Winding unit 10 is formed of winding torque roller 39 for winding film 5 with a constant torque, and winding pinch roller 40 for pressing film 5 against winding torque roller 39 in order for film 5 to follow winding torque roller 39. 5b is a wound body of used film 5. When film 5 is fixed to first mold 1a at the time of molding, in order to maintain or restore the shape and size of the pattern at the time of printing without causing wrinkles, winding torque roller 39 measures the tension thereof using a tension measuring device (not shown) and adjusts film 5 to a specified tension, independently from winding unit 8. Furthermore, winding unit 10 also has a structure which is able to carry out positioning in the film width direction independently from winding unit 8.

In the molding step of the decorative molding apparatus, film 4 and film 5 are sandwiched and clamped between first mold 1a and second mold 1b, molten resin is injected into metal mold 1 and cooled to perform predetermined molding, at which time, in a state where the uneven shape printed on film 4 is transferred to film 5 and the uneven shape is further transferred to the pattern printed on film 5, the above are simultaneously transferred to the molded body. Film 4 on which molding is completed is wound by winding unit 8, and film 5 is wound separately by winding unit 10.

A detailed description will be given of the molding step.

As shown in FIG. 1, film 4 is moved by a predetermined amount by unwinding roller 11 and a predetermined pattern is supplied to first mold 1a and, at this time, the tension of film 4 is set to a certain tension by the torque of winding torque roller 36. Furthermore, the mark imparted to film 4 is detected by camera 34, unwinding unit 7, winding unit 8, and unwinding roller 11 are moved, and film 4 is positioned at a predetermined position.

Film 5 passes between first mold 1a and clamp jig 6 to be wound by winding unit 10. At this time, film 5 is moved by a predetermined amount by unwinding roller 15 and a predetermined pattern is supplied to first mold 1a and, at this time, the tension of film 5 is set to a certain tension by the torque of winding torque roller 39. Furthermore, the mark imparted to film 5 is detected by camera 35, unwinding unit 9, winding unit 10 and unwinding roller 15 are moved, and film 5 is positioned at a predetermined position.

Figure 4A:
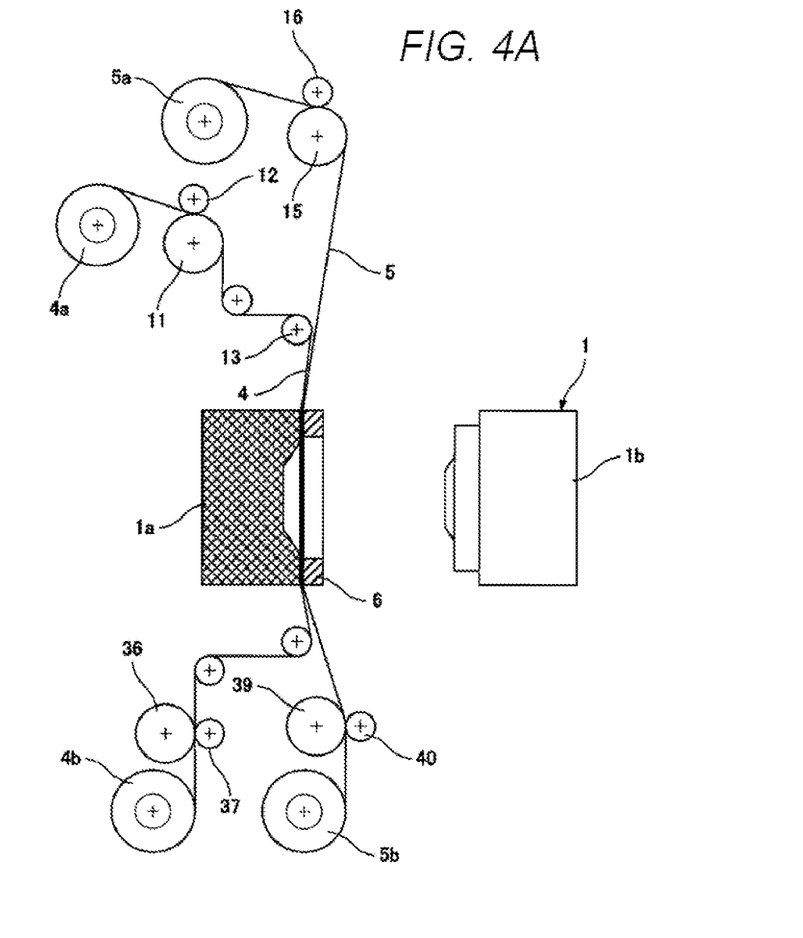
FIG. 4A is a first process diagram in which the two films are sandwiched between the first mold and a clamp jig.

Next, as shown in FIG. 4A, the tension is reduced at the same time as film 4 is supplied to first mold 1a, or unwinding pinch roller 12 and unwinding roller 11 and winding pinch roller 37 and winding torque roller 36 are released and opened, and winding torque roller 36 is turned off to release the tension applied to the film.

Furthermore, at the same time as film 4 is supplied, tension is reduced at the same time as film 5 is supplied to first mold 1a, or unwinding roller 15 and unwinding pinch roller 16 and winding pinch roller 40 and winding torque roller 39 are released and opened, and winding torque roller 39 is turned off to release the tension applied to the film.

Thereafter, film 4 and film 5 are simultaneously pressed against first mold 1a by clamp jig 6. At this time, after film 4 and film 5 are pressed against first mold 1a by clamp jig 6, the tension of film 4 and film 5 may be released.

Figure 4B:
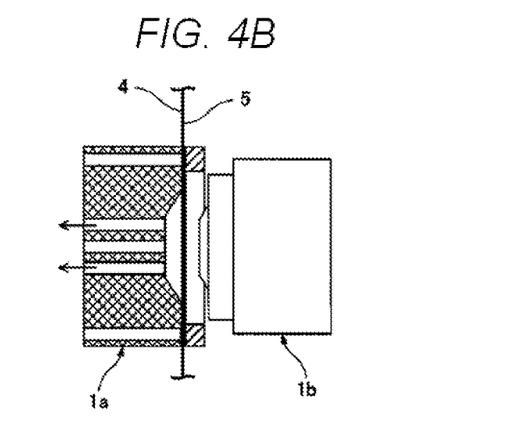
FIG. 4B is a second process diagram in which one film is adsorbed and fixed to an inner surface of the first mold by vacuum adsorption.

Next, as shown in FIG. 4B, first, film 4 is adsorbed and fixed to first mold 1a by vacuum adsorption due to vacuum suction circuit 23. At this time, since film 4 is pressed by clamp jig 6, film 4 is locally stretched within the frame of clamp jig 6 and brought into close contact with the inner surface of recessed portion 2 of first mold 1a.

Figure 5A:
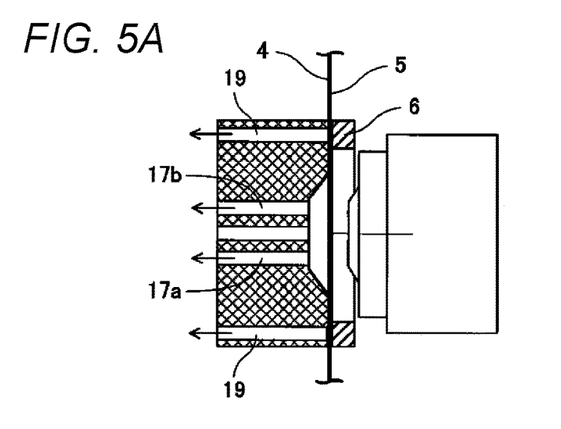
FIG. 5A is a third process diagram in which the other film is adsorbed and fixed to the first mold.

Next, as shown in FIG. 5A, film 5 is adsorbed and fixed to first mold 1a by vacuum adsorption due to vacuum suction circuit 29. At this time, film 5 is pressed by clamp jig 6, thus, by suctioning air from between film 4 and film 5, film 5 is locally stretched in the frame of clamp jig 6 and the film wrinkles are stretched out and pressed on the inner wall of first mold 1a to make it possible to adsorb and fix film 4 and film 5 to first mold 1a. At this time, pressing film 4 and film 5 using clamp jig 6 transfers the uneven shape imparted to film 4 to film 5, making it possible to further suppress shifting of the relative positions of film 4 and film 5.

In addition, at this time, the pressing force is decreased in any portion of clamp jig 6 by tilting the angle of a part of clamp jig 6 or the like such that the pulling-in of film 4 and film 5 at the time of adsorption is allowed locally to also make it possible to prevent film 4 and film 5 from breaking due to elongation and thinning.

Figure 5B:
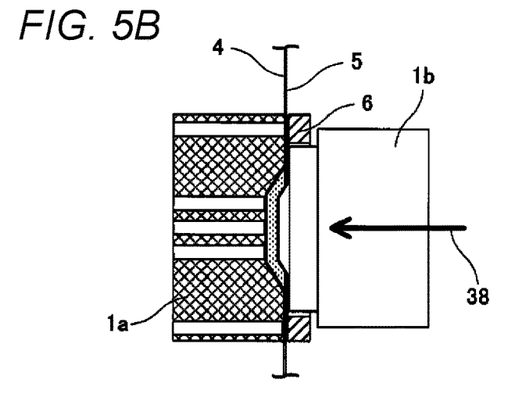
FIG. 5B is a fourth process diagram in which a resin is injected into a metal mold and cooled.

Next, as shown in FIG. 5B, second mold 1b is closed, a predetermined amount of molten resin 38 is injected therein, and molding steps such as holding under pressure and cooling are carried out. The tension of film 4 is restored to the original tension by turning on winding torque roller 36 at the time of injecting the resin and pressing unwinding pinch roller 12 and unwinding roller 11 together, and winding pinch roller 37 and winding torque roller 36 together. At the same time, the tension of film 5 is restored to the original tension by turning on winding torque roller 39 at the time of injecting the resin and pressing unwinding pinch roller 16 and unwinding roller 15 together, and winding pinch roller 40 and winding torque roller 39 together.

Figure 5C:
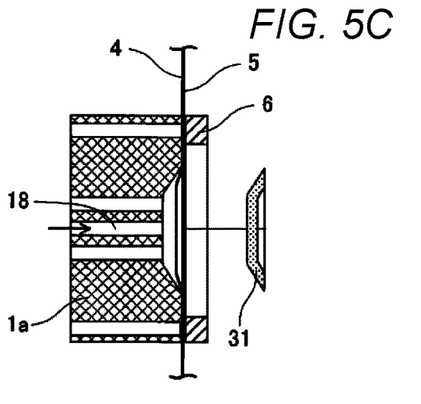
FIG. 5C is a fifth process diagram in which air is blown from the first mold side while the metal mold is open.

Next, during the mold opening as shown in FIG. 5C, air blowing is started by air blowing circuit 26 from the side of first mold 1a.

Figure 5D:
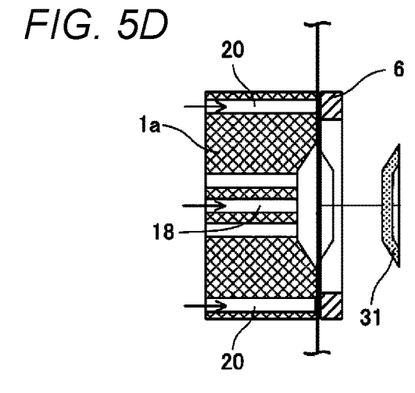
FIG. 5D is a sixth process diagram in which the one film is released from the first mold and the metal mold is opened.

Next, as shown in FIG. 5D, air blowing is started by air blowing circuit 32 from first mold 1a side, film 4 is released from first mold 1a, and first mold 1a and second mold 1b are opened. At this time, molded article 31 is released from film 4, film 5, and first mold 1a.

Figure 5E:
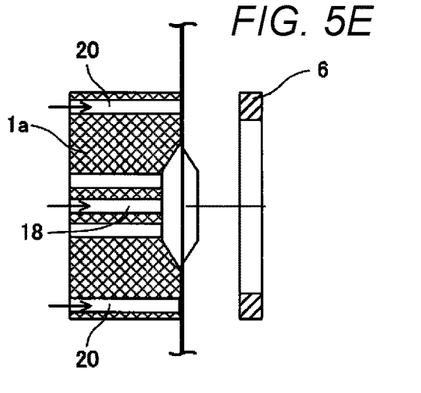
FIG. 5E is a seventh process diagram in which the clamp jig is opened and the two films are released from the first mold.

Next, as shown in FIG. 5E, clamp jig 6 is opened and film 4 and film 5 are released from first mold 1a by air blowing.

Figure 6A:
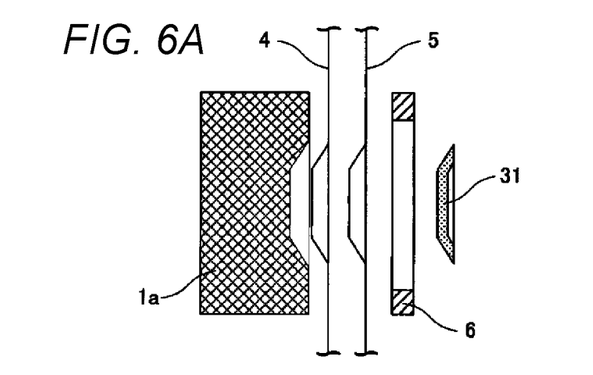
FIG. 6A is an eighth process diagram in which air is blown from the first mold.

Next, as shown in FIG. 6A, stretching the tension on film 4 and film 5 makes it possible to peel off film 4 and film 5. At the same time, molded article 31 is taken out from the molding device.

Figure 6B:
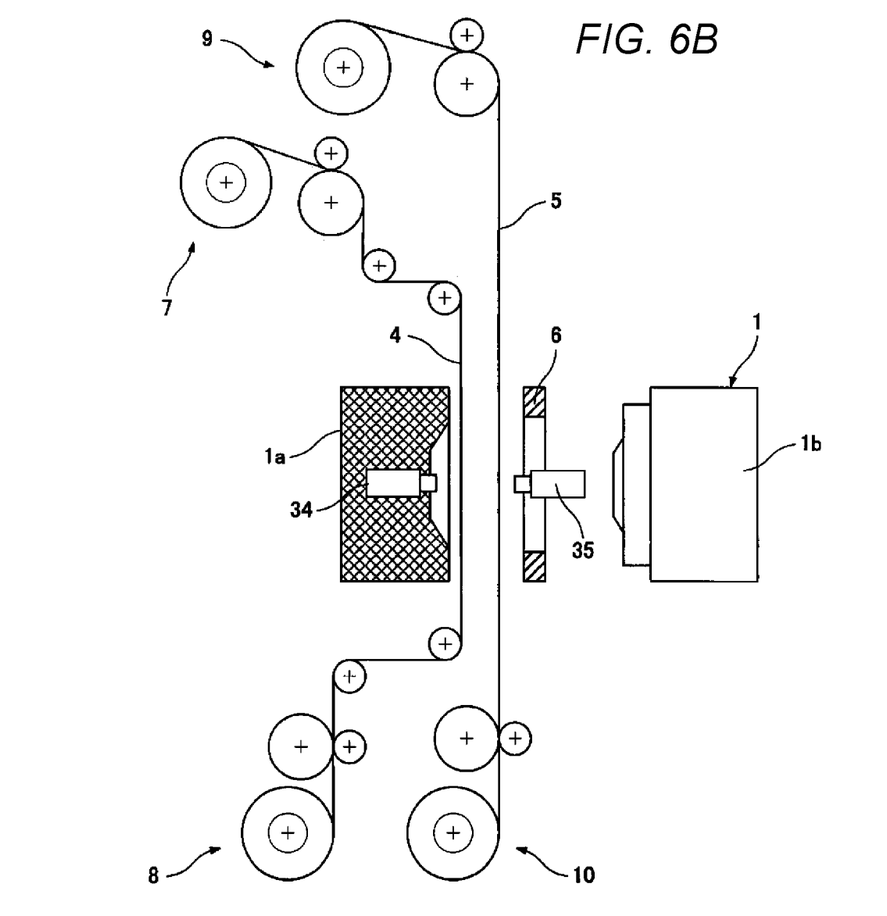
FIG. 6B is a ninth process diagram in which the two films are moved up to the following pattern.

Next, as shown in FIG. 6B, film 4 and film 5 are peeled off and respectively fed onward until the following patterns thereof. At this time, since film 4 and film 5 are deformed into the shape of the molded article, it is necessary to move a distance which is the depth of the molded article or greater in order to separately position film 4 and film 5.

In the structure in Embodiment 1, film 4 is supplied from the rear side of first mold 1a and discharged to the rear side, the film advancing direction is changed using guide roller 13 on the supply side and, after film 4 passes through first mold 1a, the film advancing direction is changed using guide roller 14 on the discharge side. Guide roller 13 and guide roller 14 are desirably installed in the vicinity of the top surface and the bottom surface of first mold 1a such that, by narrowing the section in which film 4 and film 5 are close to each other, the generation of film fragments or the like through contact is suppressed. At the same time, in the structure, film 4 tensioned by winding torque roller 36 is pulled in by guide roller 14 so as to be forcibly peeled off from film 5. Due to this, even in a case where the uneven shape of film 4 bites into film 5 and the peeling off is hard, it is possible to carry out the peeling off.

After completion of molding as shown in FIG. 5B, in FIG. 5C, air blowing is started using air blowing circuit 26 by turning on flow regulating valve 24 shown in FIG. 3 from the time when second mold 1b starts to open. This is because, by starting the air blowing on film 5 from air blowing circuit 32, air is suctioned between film 4 and film 5 such that it is possible to advance the peeling off of film 4 and film 5. Thereafter, flow regulating valve 30 is turned on to start the air blowing using air blowing circuit 32. This makes it possible to release the film from the place where the film is locally stretched, which is effective in preventing film breakage. Depending on the shape of molded article 31, air blowing circuit 26 and air blowing circuit 32 may be simultaneously turned on.

In addition, at the same time, as shown in FIG. 5D, at the time when second mold 1b is fully opened, film 4 and film 5 are released from first mold 1a by air blowing, and a sealed space formed of first mold 1a, film 4, film 5, and clamp jig 6 enters a state of being filled with air due to air blowing on film 4 and film 5, and the pressure in the interior of the sealed space is positive.

In addition, at this time, when peeling off molded article 31 from film 5, the decorative film printed on film 5 is transferred and adhered to molded article 31 and taken out, but the decorative film in the vicinity of the end of molded article 31 may become fragmented without remaining on film 5. The decorative film fragments are re-adsorbed or floated on the electrostatically charged film 5 due to the peeling off of the molded article. However, at this time, since film 5 is still pressed against first mold 1a by clamp jig 6, decorative film fragments from outside are not mixed between first mold 1a, film 4, and film 5.

In addition, as shown in FIG. 6A, when clamp jig 6 is opened and film 4 and film 5 are released from first mold 1a, in the case of Embodiment 1, since air is blown from first mold 1a and the pressure is set to be a positive pressure higher than atmospheric pressure at the periphery thereof, it is not possible for film fragments and decorative film fragments floating between film 4 and film 5 and between film 5 and molded article 31 to pass through the broken places of film 5 or to come around the end surface of film 4 and film 5 and be mixed into first mold 1a.

In addition, as shown in FIG. 6B, a decorative film for the following molding is fed between first mold 1a and clamp jig 6, but also, since air blowing controller 53 performs air blowing during this time, the decorative film fragments are not mixed into the space between first mold 1a and film 4 and between film 4 and film 5 along with the movement of film 4 and film 5.

This air blowing is effective against the mixing in of film fragments and decorative film fragments floating between the film and the molded article and between first mold 1a and the film as long as the air is used as a measure for static elimination.

Here, adsorption holes 17a and 17b may be provided in the periphery of the molded article or in a portion unnecessary in the pattern of the molded article, depending on the shape of the molded article.

In addition, adsorption is achieved by: suctioning air between first mold 1a and film 4 using adsorption holes 17a and 17b, vacuum pump 22, and vacuum suction circuit 23, and providing adsorption holes 19 in first mold 1a at a portion not overlapping with film 4; suctioning the air between first mold 1a and film 5 using vacuum pump 28 and vacuum suction circuit 29 in order to adsorb film 5 to first mold 1a thereby making it possible to adsorb and fix film 5 to first mold 1a; and suctioning air between film 4 and film 5 thereby making it possible to press film 5 against film 4 and to fix the relative positions of first mold 1a, film 4, and film 5. In addition, at the time of adsorption and fixing, the uneven shape of film 4 is transferred and bites into the pattern of film 5 due to the adsorptive force, with the effect that it becomes difficult for the relative positions between film 4 and film 5 to shift.

Furthermore, by pressing film 4 and film 5 using clamp jig 6, the uneven shape of film 4 is further transferred and bites into the pattern of film 5, with the effect that it becomes more difficult for the relative positions between film 4 and film 5 to shift.

When releasing the film, film 5 is first subjected to vacuum breaking using air blowing circuit 32 different from vacuum suction circuit 29 provided for film 5 and air blowing circuit 32 different from vacuum suction circuit 23 provided for film 4, then film 5 is peeled off from film 4 and film 4 is subjected to vacuum breaking by blowing air between film 5 and film 4, after which film 4 is released from first mold 1a by blowing air between film 4 and first mold 1a. Making the pressure in the space between first mold 1a, film 4, and film 5 positive provides an effect of preventing the introduction of foreign matter from outside of the metal mold.

Here, adsorption holes 17a and 17b may be provided in the periphery of the molded article or in a portion unnecessary in the pattern of the molded article, depending on the shape of the molded article.

The decorative molding method of the present disclosure is able to transfer the uneven shape to a pattern layer with high precision by in-mold simultaneous decorative molding and to improve the quality of appearance of a molded article.

Embodiment 2

Figure 7A:
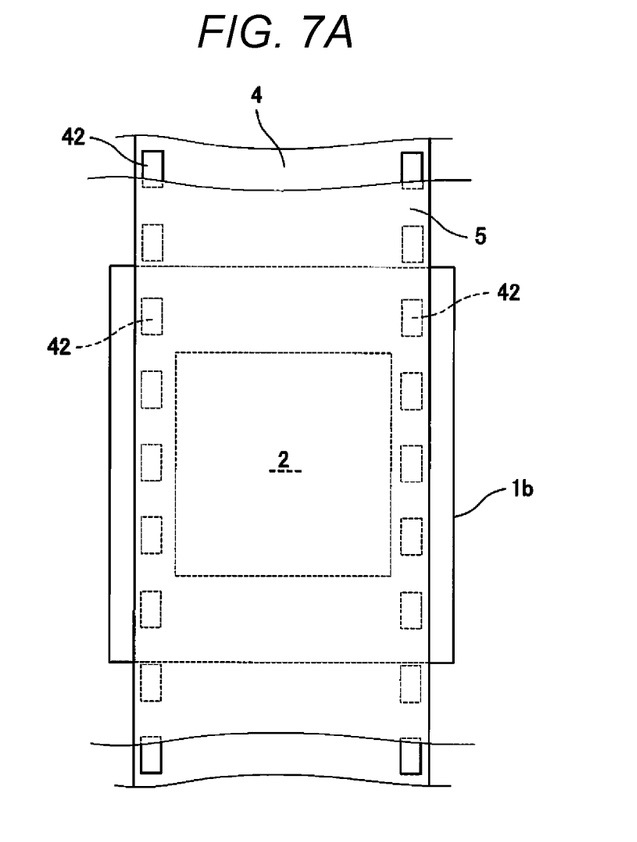
FIG. 7A is a plan diagram of the first mold of the decorative molding apparatus according to Embodiment 2 of the present disclosure and the two films inserted thereon.
Figure 7B:
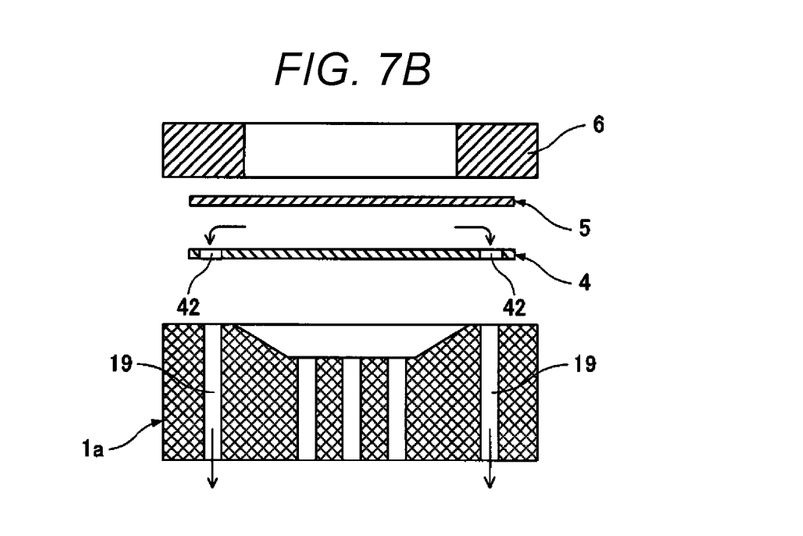
FIG. 7B is a cross-sectional view thereof.

FIGS. 7A and 7B show the main parts of the decorative molding apparatus in a case where the film width has no margin with respect to the molded article. In such a case, it is necessary to make film 4 and film 5 the same size.

In a case where there is no margin in the film width with respect to the molded article, hole 42 for adsorbing film 5 is provided in film 4. Due to this, the air is suctioned between first mold 1a and film 4 by vacuum pump 22 and vacuum suction circuit 23 to carry out the adsorption, and the air is suctioned between film 4 and film 5 by vacuum pump 28 and vacuum suction circuit 29 to make it possible to adsorb and fix film 4 and film 5 to first mold 1a.

On the other hand, although not shown, in the same manner as Embodiment 1, when releasing the film, film 5 is first vacuum-broken by the separately provided air blowing circuit, peeled off from film 4, and then film 4 is released from first mold 1a. At the same time, in the same manner as Embodiment 1, making the pressure in the space between first mold 1a, film 4, and film 5 positive provides an effect of preventing the introduction of foreign matter from outside of the metal mold.

Embodiment 3

Figure 8A:
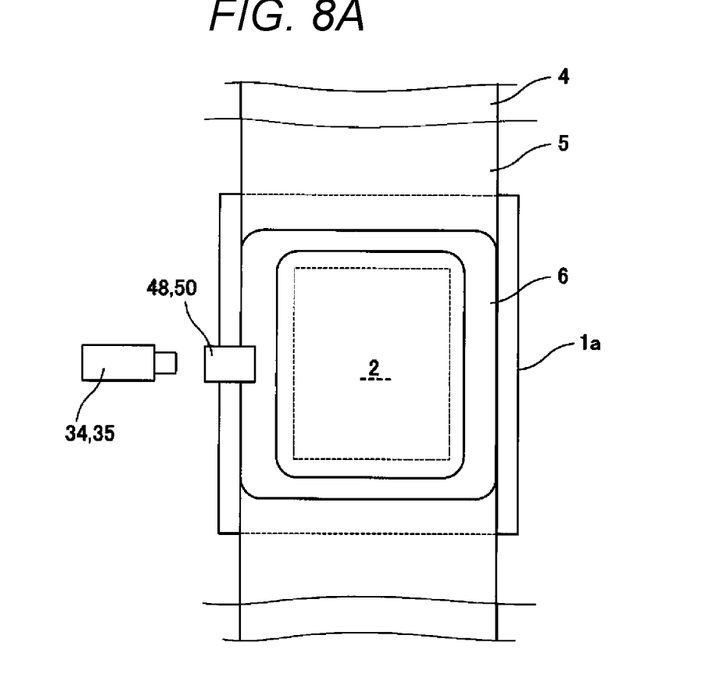
FIG. 8A is a plan diagram of the first mold of a decorative molding apparatus according to Embodiment 3 of the present disclosure and the two films inserted thereon.
Figure 8B:
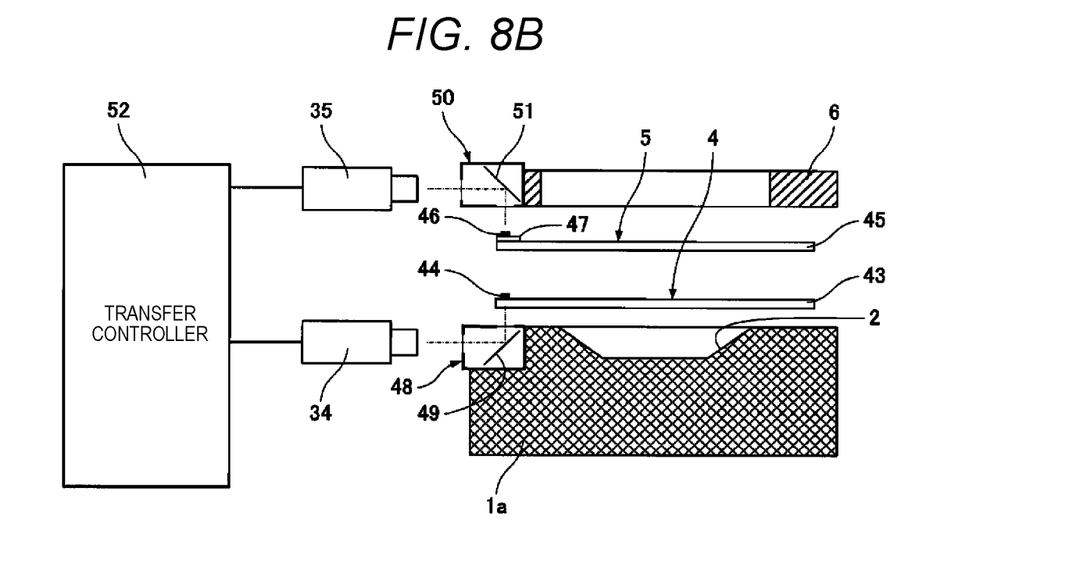
FIG. 8B is a cross-sectional view thereof.

FIGS. 8A and 8B show a specific example in which the marks imparted to the film are detected in first mold 1a, the shifting amount is calculated, and positioning is carried out.

In film 4, mark 44 as a first mark is printed on base material film 43. At this time, base material film 43 is desirably a transparent film such as PET. In addition, mark 44 is desirably a material that does not transmit light.

In film 5, mark 46 as a second mark is printed on base material film 45. At this time, base material film 45 is desirably a film such as PET. In addition, mark 46 is desirably a material which does not transmit light.

Reflecting plate 49 is installed inside first mirror box 48. Reflecting plate 51 is installed inside second mirror box 50.

Mark 44 imparted to film 4 is reflected in first mirror box 48 installed in the mold, the optical path thereof is bent by reflecting plate 49 and detected by camera 34 to detect the position thereof. In addition, mark 46 imparted to film 5 is reflected in second mirror box 50 installed in the mold, the optical path thereof is bent by reflecting plate 51 and detected by camera 35 to detect the position thereof. Transfer controller 52 calculates the difference in the positions detected by cameras 34 and 35 and moves unwinding unit 7 and winding unit 8, and unwinding unit 9 and winding unit 10, respectively, to reduce the shifting amount.

Since the gap between film 5 and film 4 is independently positioned after molding, it is necessary to provide a gap of several millimeters or greater depending on the shape of the molded article. Accordingly, it is difficult for cameras 34 and 35 to simultaneously detect marks 44 and 46 at focus points in the same visual field. In this embodiment, on film 5 side, concealing layer 47 is provided on the lower layer of mark 46. Concealing layer 47 is a material that does not transmit light. Due to this, it is possible for mark 46 to be detected by camera 35 in the in-focus state, and it is also possible for mark 44 to be detected by camera 34 in the in-focus state since concealing layer 47 is set as the background, it is possible to position film 4 and film 5 at the same time, and it is possible to carry out the positioning with high precision.

As described above, according to Embodiment 1 and/or embodiments 2 and 3, it is possible to prevent the introduction of foreign matter into the molded article due to the film fragments after molding and decorative film fragments while simultaneously positioning and molding the film to be decorated with high precision, and it is possible to improve the quality of the appearance of the molded article.

According to the present disclosure, since it is possible to favorably transfer a pattern having an uneven shape to surfaces of various molded articles to be resin-molded using a decorative film, the quality of appearance of the decoration of various molded articles is improved.

What is claimed is:

1. A molding method comprising:
separately supplying a first film, to which an uneven shape is imparted, and a second film, to which a pattern is imparted, inside one metal mold while the first film and the second film are spaced apart from each other;
separately positioning the first film and the second film; and
injecting a molding material into the metal mold to transfer the pattern imparted with the uneven shape while simultaneously molding a molded article,
wherein the uneven shape of the first film includes at least one irregularity on a surface of the first film.

2. The molding method of claim 1, further comprising:
separately supplying the first film with a first belt shape which is unwound from a first unwinding unit and the second film with a second belt shape which is unwound from a second unwinding unit between a first mold and a second mold forming the metal mold while the first film and the second film are spaced apart from each other;
pressing the first film and the second film against the first mold with a clamp jig;
suctioning the second film into contact with the first mold via the first film in the first mold;
releasing the first film and the second film by air blowing as the metal mold is opened and releasing the pressing by the clamp jig; and
separately winding each used section of the first film and the second film by a winding unit in a state where the first film and the second film are spaced apart from each other such that a following uneven shape of the first film and a following pattern of the second film each arrive at a molding position of the metal mold,
wherein the following uneven shape of the first film includes at least one irregularity on the surface of the first film.

3. The molding method of claim 2, further comprising:
after the injecting of the molding material, starting the air blowing on each of the first film and the second film, bringing an interior of a sealed space formed by the first mold, the first film, the second film, and the clamp jig into a positive pressure state, and then taking out the molded article; and
continuing the air blowing after the releasing of the pressing by the clamp jig until the following uneven shape of the first film and the following pattern of the second film arrive at the molding position of the metal mold.

4. The molding method of claim 2, further comprising:
operating a first vacuum suction circuit to adsorb the first film to the first mold;
operating a second vacuum suction circuit separate to the first vacuum suction circuit to adsorb the second film to the first mold; and
simultaneously pressing the first film and the second film using the clamp jig, then adsorbing the first film to the first mold first, and adsorbing the second film later, to bring the first film and the second film into contact with the first mold.

5. The molding method of claim 4, further comprising:
operating a first air blowing circuit and a second air blowing circuit simultaneously to the operating of the first and second vacuum suction circuits for carrying out adsorbing, after releasing the molded article.

6. The molding method of claim 2, wherein the releasing of the first film and the second film by air blowing further comprises:
operating a second air blowing circuit to blow air to the second film farther from the first mold than the first film after the injecting of the molding material; and
operating a first air blowing circuit separate from the second air blowing circuit to blow air to the first film closer to the first mold than the second film after the operating of the second air blowing circuit.

7. The molding method of claim 2, further comprising:
performing an operation in which a first vacuum suction circuit for adsorbing the first film to the first mold and a first air blowing circuit for releasing the first film from the first mold are set as separate circuits and/or a second vacuum suction circuit for adsorbing the second film to the first mold and a second air blowing circuit for releasing the second film from the first mold are set as separate circuits.

8. The molding method of claim 2, further comprising:
reflecting a first mark imparted to the first film in a first mirror box installed in the metal mold and detecting the first mark using a first camera;
reflecting a second mark imparted to the second film in a second mirror box installed in the metal mold and detecting the mark using a second camera; and
calculating a difference between positions detected by the first camera and the second camera and separately moving the first film and the second film to reduce a shifting amount.

9. A molding method comprising:
unwinding a first film from a first unwinding unit, the first film having an uneven shape;
unwinding a second film from a second unwinding unit, the second film having a pattern;
supplying the first film a first predetermined unwinding amount to arrive at a molded position and separately supplying the second film a second predetermined unwinding amount to arrive at the molded position, wherein the molded position is between a first mold and a second mold and the first film and the second film are spaced apart from each other;
positioning the first film to a first predetermined position and positioning the second film to a second predetermined position;
pressing the first film and the second film against the first mold with a clamp jig;
suctioning the first film such that the first film is in contact with the first mold;
suctioning the second film such that the second film is in contact with the first mold via the first film in the first mold;
clamping the first mold and the second mold together to form a metal mold;
injecting a molding material into the metal mold to transfer the pattern and the uneven shape while simultaneously molding a molded article;
opening the metal mold and simultaneously blowing air to release the first film and the second film;
releasing the clamp jig from the first mold;
removing the molded article; and
winding a first used section of the first film a first predetermined winding amount by a first winding unit and separately winding a second used section of the second film a second predetermined winding amount by a second winding unit,
wherein the uneven shape of the first film includes at least one irregularity on a surface of the first film.

* * * * *